US012617473B2

(12) United States Patent
Terui et al.

(10) Patent No.: US 12,617,473 B2
(45) Date of Patent: May 5, 2026

(54) VEHICLE BODY FLOOR STRUCTURE

(71) Applicant: Honda Motor Co., Ltd., Tokyo (JP)

(72) Inventors: Taiki Terui, Tokyo (JP); Shungo Chino, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 18/403,733

(22) Filed: Jan. 4, 2024

(65) Prior Publication Data

US 2024/0317319 A1    Sep. 26, 2024

(30) Foreign Application Priority Data

Mar. 21, 2023    (CN) .......................... 202310278848.X

(51) Int. Cl.
| | |
|---|---|
| *B62D 25/00* | (2006.01) |
| *B62D 21/02* | (2006.01) |
| *B62D 25/20* | (2006.01) |

(52) U.S. Cl.
CPC ............. *B62D 25/20* (2013.01); *B62D 21/02* (2013.01)

(58) Field of Classification Search
CPC ................ B62D 25/20; B62D 25/2009; B62D 25/2018; B62D 25/2027; B62D 25/2036; B62D 25/2045; B62D 21/02

USPC ....................................................... 296/193.07
See application file for complete search history.

(56) References Cited

U.S. PATENT DOCUMENTS

| | | | |
|---|---|---|---|
| 11,873,030 B2 * | 1/2024 | Pyun ...................... | B62D 25/20 |
| 12,528,544 B2 * | 1/2026 | An ...................... | B62D 25/2036 |

FOREIGN PATENT DOCUMENTS

JP            6631472          1/2020

* cited by examiner

*Primary Examiner* — Steven O Douglas
(74) *Attorney, Agent, or Firm* — JCIPRNET

(57)        ABSTRACT

The vehicle body floor structure includes a floor including a front panel located at front and a rear panel located at rear and formed at a position above the front panel; lower longitudinal beams located on both sides of the floor in a vehicle width direction; a floor cross beam connected to the lower longitudinal beams on outer sides in the vehicle width direction; and a floor tunnel connected to a center of the floor cross beam in the vehicle width direction. The floor cross beam includes a step portion above the floor tunnel, and the step portion is curved upward while extending from both ends toward the center as a whole when viewed from a front angle between the lower longitudinal beams.

8 Claims, 6 Drawing Sheets

VEHICLE BODY FLOOR STRUCTURE

CROSS-REFERENCE TO RELATED APPLICATION

This application claims the priority benefits of China application no. 202310278848.X, filed on Mar. 21, 2023. The entirety of the above-mentioned patent application is hereby incorporated by reference herein and made a part of this specification.

BACKGROUND

Technical Field

The disclosure relates to a vehicle body floor structure.

Description of Related Art

In recent years, efforts have been made to provide sustainable transportation systems that take into account vulnerable people such as the elderly and children among traffic participants. In order to achieve the above purpose, research and development related to vehicle body rigidity are being carried out, aiming to further improve traffic safety and convenience.

Patent Document 1 (Japanese Patent No. 6631472) discloses a vehicle body floor structure equipped with an Intelligent Power Unit (IPU). The intelligent power unit includes components such as a power battery and management system, a motor controller, a DC power supply or DC power converter, and a cooling system, which are unique components of a hybrid electric vehicle. In Patent Document 1, the intelligent power unit is placed under the rear seats and protected by a ring frame composed of a floor cross beam and a rear side frame. However, as the floor cross beam is connected to a floor tunnel on the center side, the cross section on the center side becomes smaller and may not be able to fully support the load during a side collision. Furthermore, since the floor tunnel merges with the floor cross beam, the cross section of the floor cross beam is reduced and offset, making it more easily deformed.

An embodiment of the disclosure provides a vehicle body floor structure which has favorable rigidity and is capable of suppressing deformation.

SUMMARY

An embodiment of the disclosure provides a vehicle body floor structure, including a floor including a front panel located at front and a rear panel located at rear and formed at a position above the front panel; lower longitudinal beams located on both sides of the floor in a vehicle width direction; a floor cross beam connected to the lower longitudinal beams on outer sides in the vehicle width direction; and a floor tunnel connected to a center of the floor cross beam in the vehicle width direction. The floor cross beam includes a step portion above the floor tunnel, and the step portion is curved upward while extending from both ends toward the center as a whole when viewed from a front angle between the lower longitudinal beams.

DESCRIPTION OF THE EMBODIMENTS

Figure 1:
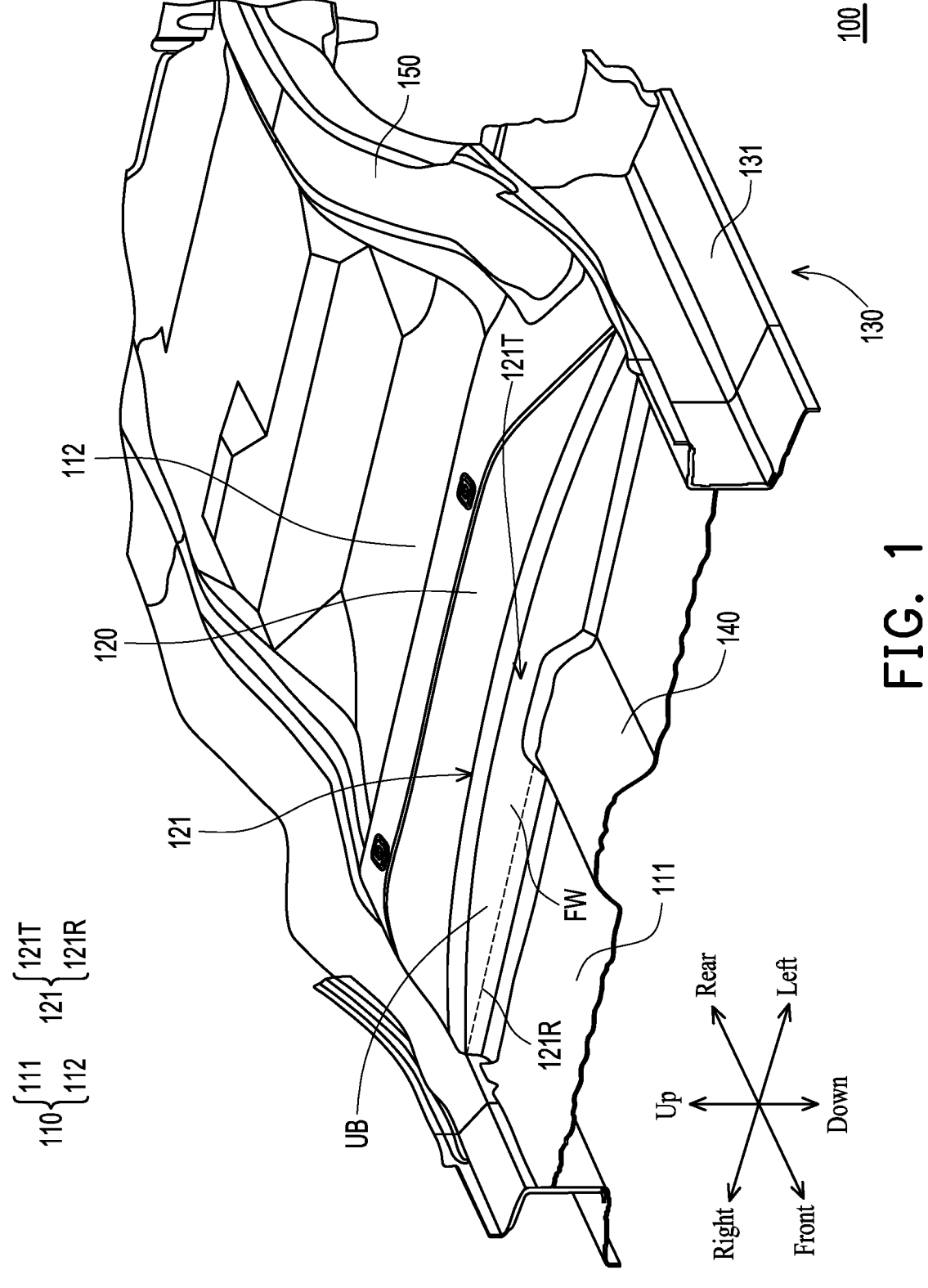
FIG. 1 is a schematic perspective view of a vehicle body floor structure according to an embodiment of the disclosure.

An embodiment of the disclosure provides a vehicle body floor structure, including a floor including a front panel located at front and a rear panel located at rear and formed at a position above the front panel; lower longitudinal beams located on both sides of the floor in a vehicle width direction; a floor cross beam connected to the lower longitudinal beams on outer sides in the vehicle width direction; and a floor tunnel connected to a center of the floor cross beam in the vehicle width direction. The floor cross beam includes a step portion above the floor tunnel, and the step portion is curved upward while extending from both ends toward the center as a whole when viewed from a front angle between the lower longitudinal beams.

In an embodiment of the disclosure, the floor cross beam includes an upper member and a lower member, and the upper member and the lower member form a closed cross section. The lower member includes a lower wall forming a lower portion of the closed cross section and a rear wall forming a rear portion of the closed cross section, and the rear wall of the lower member extends upward from the closed cross section and is joined to a front edge of the rear panel.

In an embodiment of the disclosure, the upper member includes a front wall forming a front portion of the closed cross section and an upper wall forming an upper portion of the closed cross section. The step portion is formed by the front wall and the upper wall, and the front wall has a ridge line that extends from a vehicle width outer end toward the floor tunnel at a height of the floor tunnel.

In an embodiment of the disclosure, the step portion includes a top portion at a center in the vehicle width direction where the floor cross beam and the floor tunnel are connected, and the top portion is highest in height from the front panel.

In an embodiment of the disclosure, an upper edge of the rear wall includes a curved portion, which is curved downward toward the lower longitudinal beam, between the top portion and an outer end of the floor cross beam in the vehicle width direction.

In an embodiment of the disclosure, the rear wall includes an inclined portion that is inclined forward toward the lower wall.

In an embodiment of the disclosure, when viewed from a bottom of a vehicle body, the lower member includes a recessed portion that is recessed upward toward the vehicle body at a center in the vehicle width direction. The recessed portion is formed along an opening cross section of the floor tunnel and is connected to the opening cross section of the floor tunnel, and the recessed portion includes a widened portion expanding outward in the vehicle width direction on a rear side in a vehicle length direction.

In an embodiment of the disclosure, the rear panel includes a rear side frame on an outer side in the vehicle width direction. The rear side frame and the floor cross beam are separated from each other in a vehicle length direction, and the lower longitudinal beam includes a connecting member for connecting the rear side frame and the floor cross beam.

Based on the above, in the vehicle body floor structure according to the embodiments of the disclosure, the floor cross beam is provided with the step portion curved above the floor tunnel so as to efficiently transfer a load input from the rear seats and a side impact load input from a side, thereby improving the rigidity. Therefore, the cross section of the floor cross beam can be made smaller without compromising the strength against deformation.

In order to make the above-mentioned and other features and advantages of the disclosure more understandable, exemplary embodiments will be described in detail with reference to the accompanying drawings.

Figure 2:
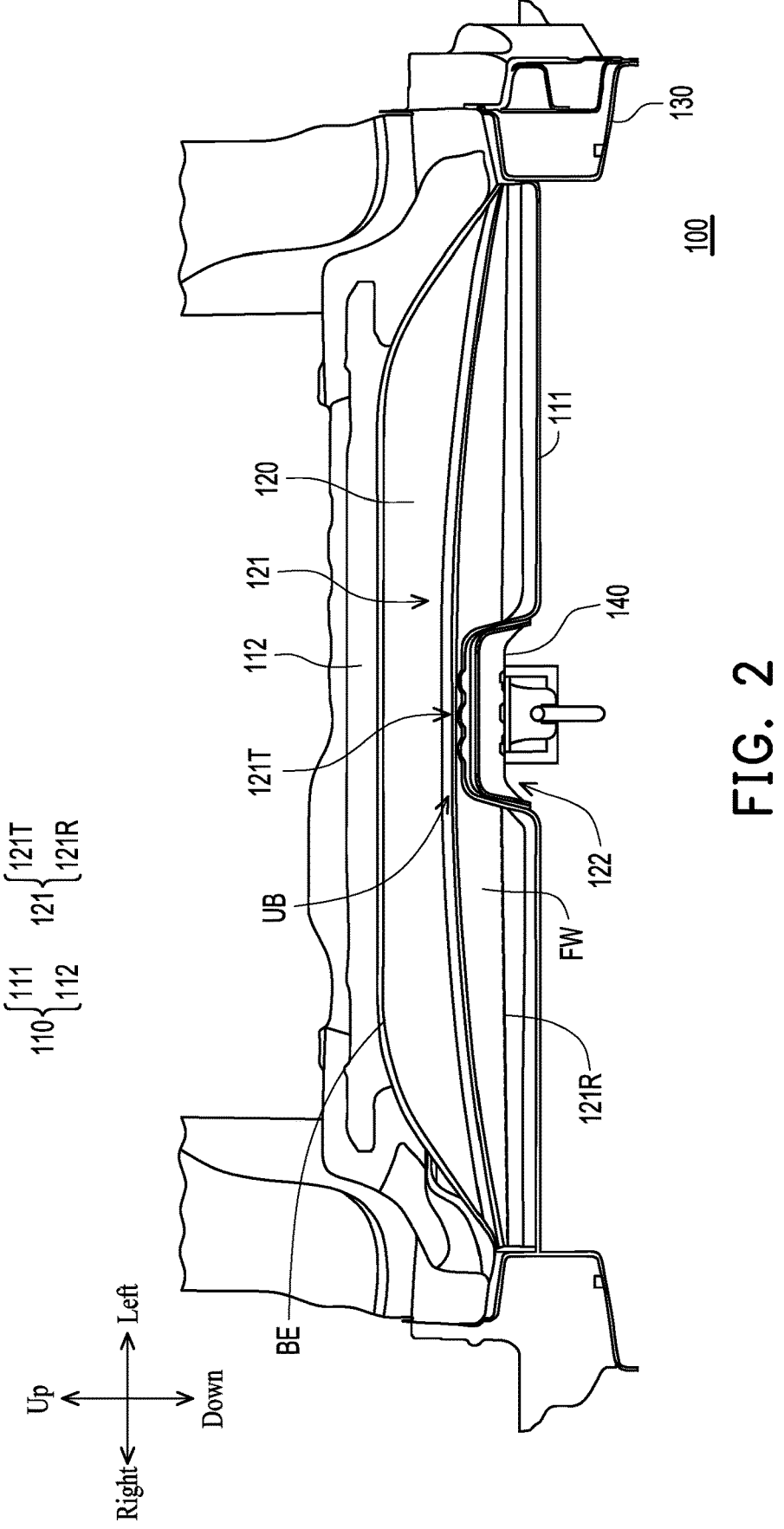
FIG. 2 is a schematic front view of the vehicle body floor structure of FIG. 1.
Figure 3:
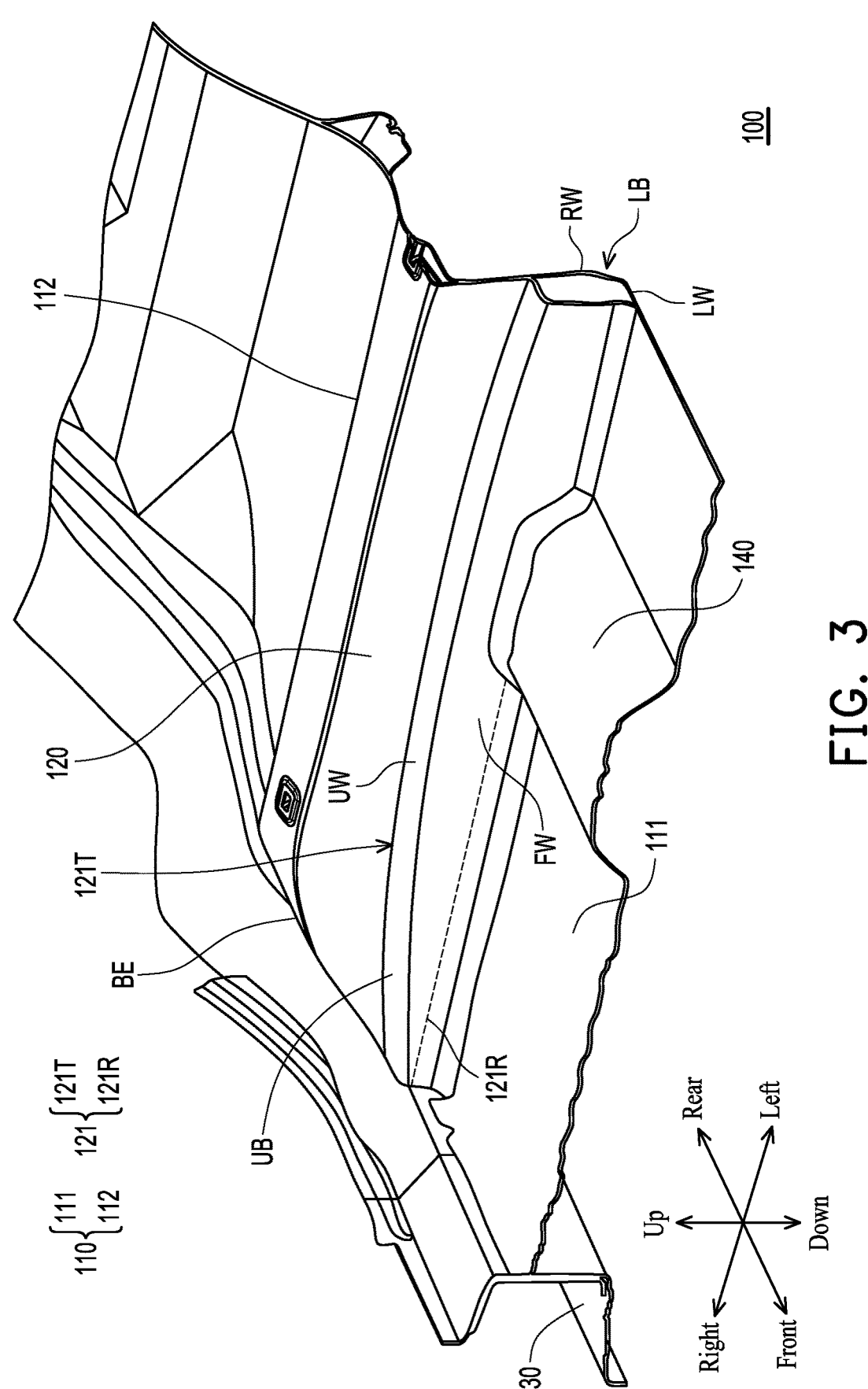
FIG. 3 is a schematic cross-sectional view of the vehicle body floor structure of FIG. 1 from the perspective of FIG. 1.
Figure 4:
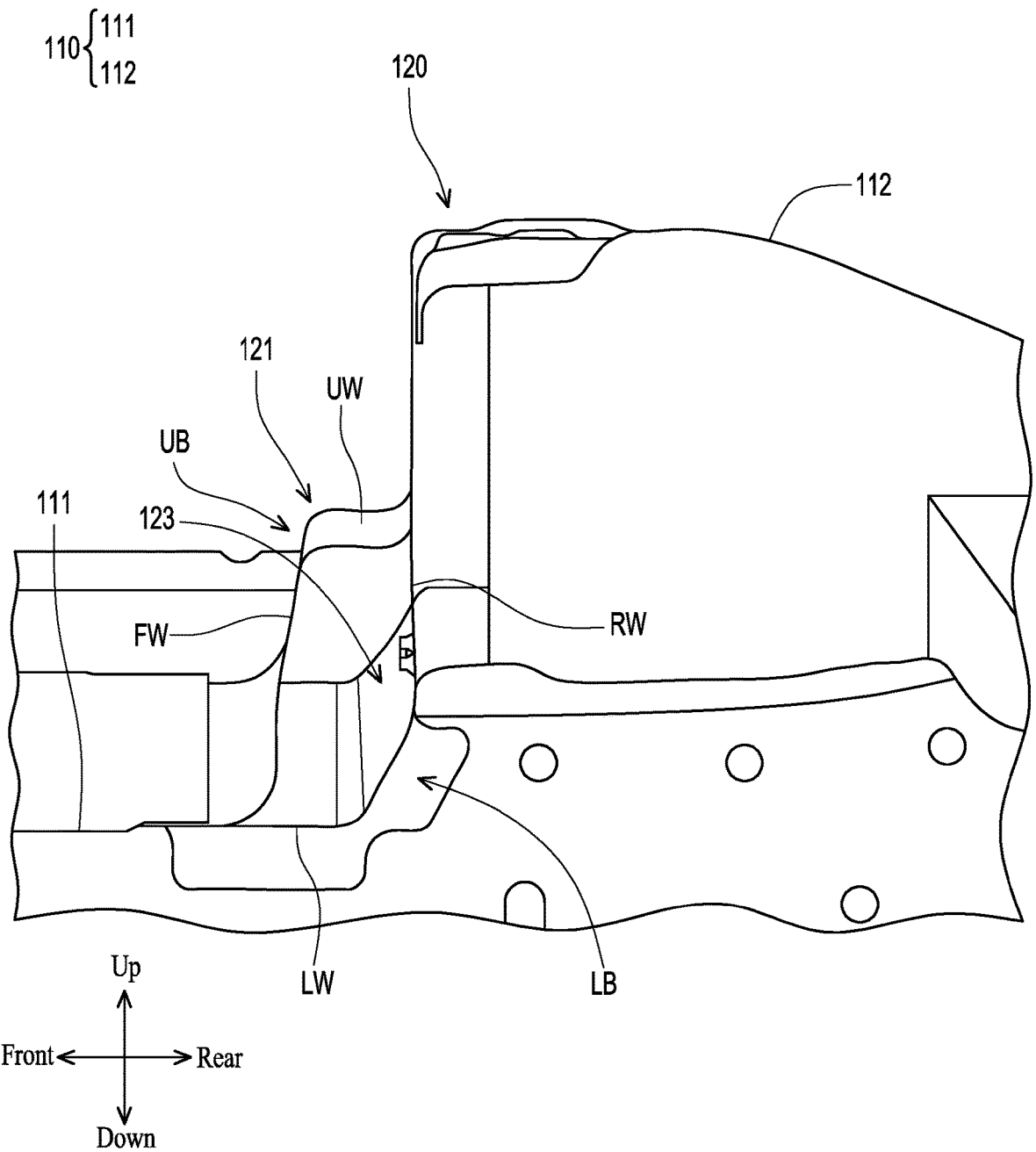
FIG. 4 is a schematic side cross-sectional view of the vehicle body floor structure of FIG. 1.
Figure 5:
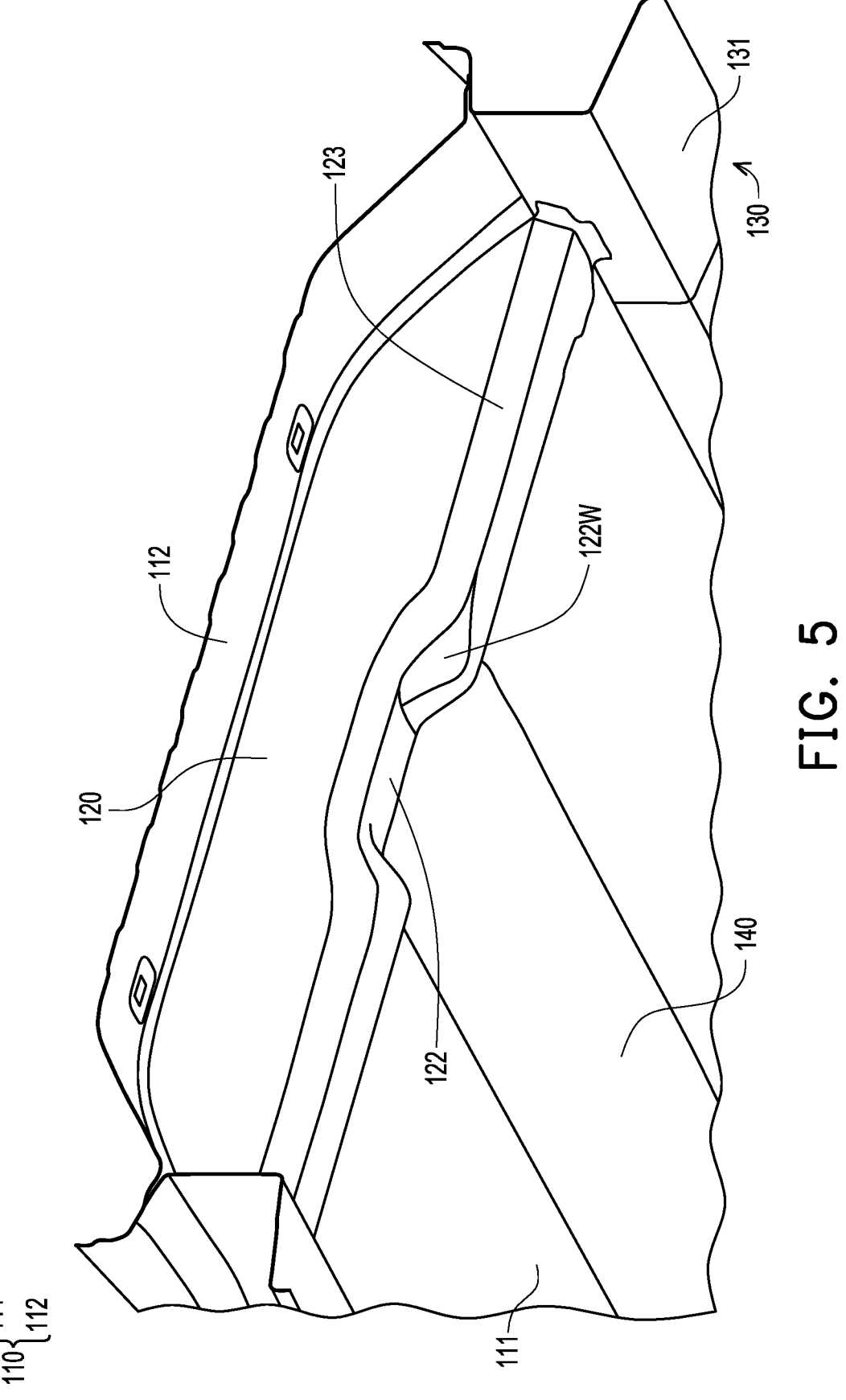
FIG. 5 is a schematic perspective view of the vehicle body floor structure of FIG. 1 with the rear panel removed.
Figure 6:
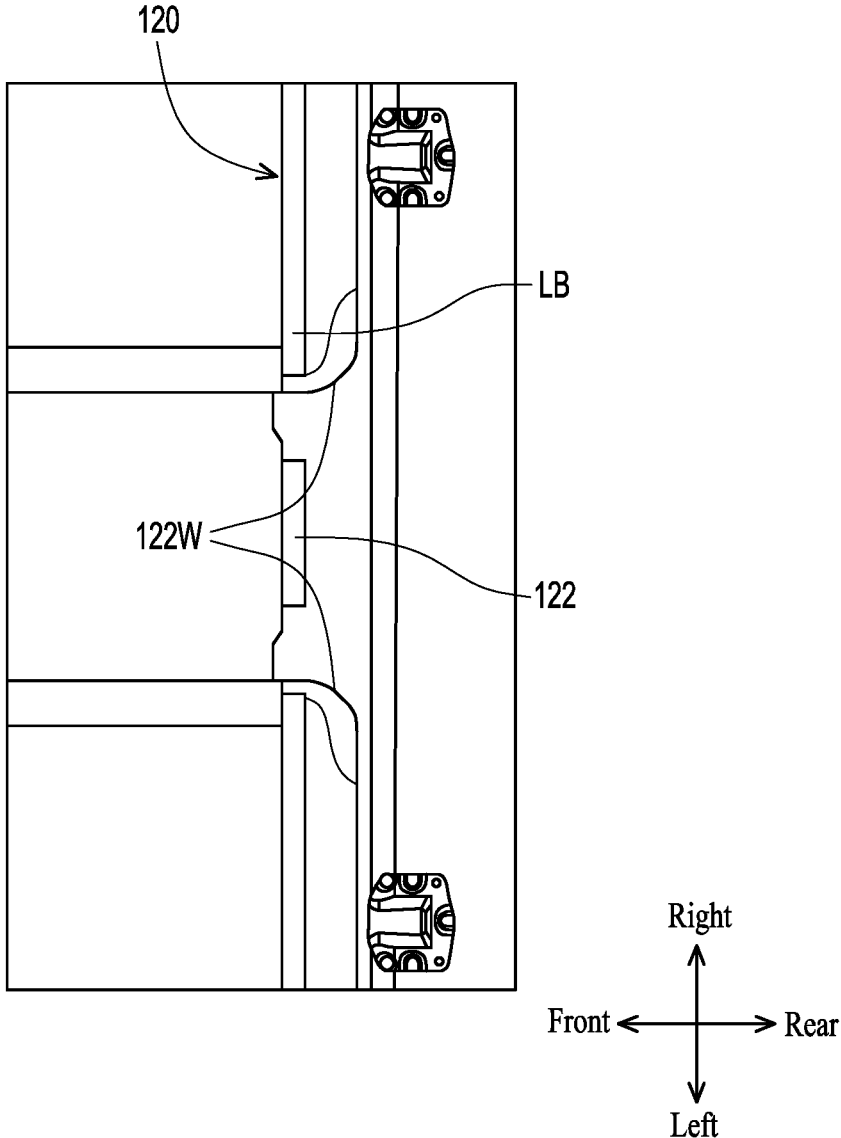
FIG. 6 is a schematic bottom view of the vehicle body floor structure of FIG. 1.

FIG. 1 is a schematic perspective view of a vehicle body floor structure according to an embodiment of the disclosure; FIG. 2 is a schematic front view of the vehicle body floor structure of FIG. 1; FIG. 3 is a schematic cross-sectional view of the vehicle body floor structure of FIG. 1 from the perspective of FIG. 1; FIG. 4 is a schematic side cross-sectional view of the vehicle body floor structure of FIG. 1; FIG. 5 is a schematic perspective view of the vehicle body floor structure of FIG. 1 with the rear panel removed; and FIG. 6 is a schematic bottom view of the vehicle body floor structure of FIG. 1. It should be noted that, for convenience, the front-rear direction, the left-right direction, and the up-down direction of the vehicle are defined as shown in the drawings, and the configuration of each part is described based on these definitions. The front-rear direction, the left-right direction, and the up-down direction are respectively equivalent to a vehicle length direction, a vehicle width direction, and a vehicle height direction.

Specifically, in this embodiment, a vehicle body is made of high-strength metal plates such as steel plates and aluminum alloy plates. In this embodiment, a vehicle body floor structure 100 refers to a structure arranged near a floor cross beam 120 and a floor tunnel 140.

Referring to FIG. 1 to FIG. 6, in this embodiment, the vehicle body floor structure 100 includes a floor 110, the floor cross beam 120, a pair of left and right lower longitudinal beams 130, and the floor tunnel 140. The floor 110 includes a front panel 111 located at the front and a rear panel 112 located at the rear and formed at a position above the front panel 111. The front panel 111 is disposed between the lower longitudinal beams 130 and the floor tunnel 140, and the rear panel 112 is disposed behind the floor cross beam 120. For example, the floor 110 is made of a relatively thin metal plate such as a steel plate or an aluminum alloy plate. The floor cross beam 120 is arranged in the vehicle width direction and is orthogonal to the floor tunnel 140, and is connected to the lower longitudinal beams 130 on the outer sides of the floor 110 in the vehicle width direction and is arranged below the rear seats (not shown) of a vehicle compartment. The lower longitudinal beams 130 are located on both sides of the floor 110 in the vehicle width direction and extend in the vehicle length direction to be connected to both ends of the floor cross beam 120. The floor tunnel 140 is connected to the center of the floor cross beam 120 in the vehicle width direction and extends in the vehicle length direction at the central portion of the floor 110. The vehicle body is substantially symmetrical with the floor tunnel 140 as the center. In this embodiment, the floor tunnel 140 not only forms an arrangement space for structures extending in the vehicle length direction, such as fuel pipes and exhaust pipes, but also contributes to improving the rigidity of the floor 110.

Furthermore, as shown in FIG. 1, in this embodiment, the floor cross beam 120 is arranged between the front panel 111 of the floor 110 and the rear panel 112 formed above the front panel 111. The floor cross beam 120 has a step portion 121 above the floor tunnel 140. In addition, as shown in FIG. 1 and FIG. 2, in this embodiment, when viewed from a front angle between the lower longitudinal beams 130, the step portion 121 is curved upward while extending from both ends toward the center as a whole. By forming the step portion 121, which is curved upward while extending from both ends toward the center, above the floor tunnel 140 in this way, a load input from the rear seats and a side impact load input from a side can be efficiently transferred and the rigidity can be improved. Therefore, the cross section of the floor cross beam 120 can be made smaller without compromising the strength against deformation.

Furthermore, as shown in FIG. 3 and FIG. 4, in this embodiment, the floor cross beam 120 includes an upper member UB and a lower member LB, and the upper member UB and the lower member LB form a closed cross section. More specifically, the upper member UB includes a front wall FW forming a front portion of the closed cross section and an upper wall UW forming an upper portion of the closed cross section. The lower member LB includes a rear wall RW forming a rear portion of the closed cross section and a lower wall LW forming a lower side of the closed cross section. Further, as shown in FIG. 3 and FIG. 4, the rear wall RW of the lower member LB of the floor cross beam 120 extends upward from the closed cross section and is joined to the front edge of the rear panel 112 of the floor 110, and as shown in FIG. 1 and FIG. 3, the front wall FW and the upper wall UW of the upper member UB are connected above the floor tunnel 140 to form the step portion 121 that extends in the vehicle width direction and is curved upward while extending from both ends toward the center as a whole. The front wall FW has a ridge line 121R that extends from a vehicle width outer end toward the floor tunnel 140 at the height of the floor tunnel 140.

By connecting the rear wall RW to the rear panel 112 above the closed cross section in this way, a side impact load can be effectively transferred and the rigidity can be improved. Furthermore, by providing the ridge line 121R on the front wall FW of the upper member UB where the step portion 121 is formed, a load input from a side can be efficiently transferred to the floor tunnel 140, thereby improving the rigidity of the floor cross beam 120. Therefore, the cross section of the floor cross beam 120 can be made smaller without compromising the strength against deformation.

In addition, as shown in FIG. 2, in this embodiment, the step portion 121 has a top portion 121T at the center in the vehicle width direction where the floor cross beam 120 and the floor tunnel 140 are connected. The top portion 121T is highest in height from the front panel 111 of the floor 110. By making the step portion 121 highest above the floor tunnel 140, the area of the cross section at the position between the floor cross beam 120 and the floor tunnel 140 are connected can be ensured to suppress deformation.

Moreover, as shown in FIG. 2 and FIG. 3, in this embodiment, the upper edge of the rear wall RW has a curved portion BE, which extends toward the lower longitudinal beam 130 and is curved downward toward the lower longitudinal beam 130, at the outer end of the top portion 121T in the vehicle width direction. By providing the curved portion BE between the upper edge of the rear wall RW and the end of the floor cross beam 120 and arranging the curved portion BE outside the top portion 121T of the step portion 121, when a collision load is input from a side, the stress concentrated on the curved portion BE can be effectively dispersed through the step portion 121, thereby suppressing deformation of the floor cross beam 120.

As shown in FIG. 4 and FIG. 5, in this embodiment, the rear wall RW has an inclined portion 123 that is inclined forward toward the lower wall LW. By forming the inclined portion 123 on the rear wall RW of the lower member LB, the cross section of the floor cross beam 120 can be reduced to reduce the weight. Besides, the inclined portion 123 can be used to increase the ridge line and thus form a reinforcing rib to improve the rigidity of the floor cross beam 120.

As shown in FIG. 2, FIG. 5, and FIG. 6, in this embodiment, the lower member LB is connected to an opening cross section of the floor tunnel 140 at the center in the vehicle width direction. When viewed from the bottom of the vehicle body, the lower member LB has a recessed portion 122 that is recessed upward toward the vehicle body at the center in the vehicle width direction. The recessed portion 122 is formed along the opening cross section of the floor tunnel 140 and is connected to the opening cross section of the floor tunnel 140. The recessed portion 122 has a widened portion 122W expanding outward in the vehicle width direction on the rear side in the vehicle length direction. By providing the widened portion 122W, the floor cross beam 120 connected to the floor tunnel 140 is wider than the floor tunnel 140 at the recessed portion 122 that is continuous with the opening cross section of the floor tunnel 140, which allows the load during a side collision to be smoothly transferred to the other side. Thus, when a side collision occurs, the input load can be dispersed and transferred to suppress deformation of the recessed portion 122 and the floor tunnel 140.

In addition, as shown in FIG. 1, in this embodiment, the rear panel 112 includes a rear side frame 150 on the outer side in the vehicle width direction. The rear side frame 150 and the floor cross beam 120 are separated from each other in the vehicle length direction, and the lower longitudinal beam 130 includes a connecting member 131 for connecting the rear side frame 150 and the floor cross beam 120. By connecting the floor cross beam 120 and the rear side frame 150 with the connecting member 131 in the cross section of the lower longitudinal beam 130, a load input from the seat to the floor cross beam 120 can be transferred to the rear side frame 150 through the connecting member 131. Therefore, deformation of the floor cross beam 120 can be suppressed.

To sum up, in the vehicle body floor structure according to the embodiments of the disclosure, the floor cross beam is provided with the step portion curved above the floor tunnel so as to efficiently transfer a load input from the rear seats and a side impact load input from a side, thereby improving the rigidity. Therefore, the cross section of the floor cross beam can be made smaller without compromising the strength against deformation.

Finally, it should be noted that the above embodiments are illustrative, rather than restrictive, to the technical solutions of the disclosure. Although the disclosure has been described in detail with reference to the above embodiments, those skilled in the art should understand that it is possible to modify the technical solutions described in the above embodiments or to equivalently substitute some or all of the technical features. These modifications or substitutions do not cause the essence of the corresponding technical solutions to depart from the scope of the technical solutions of the embodiments of the disclosure.

What is claimed is:

1. A vehicle body floor structure, comprising:
a floor comprising a front panel located at front and a rear panel located at rear and formed at a position above the front panel;
lower longitudinal beams located on both sides of the floor in a vehicle width direction;
a floor cross beam connected to the lower longitudinal beams on outer sides in the vehicle width direction; and
a floor tunnel connected to a center of the floor cross beam in the vehicle width direction,
wherein the floor cross beam comprises a step portion above the floor tunnel, and the step portion is curved upward while extending from both ends toward the center as a whole when viewed from a front angle between the lower longitudinal beams.

2. The vehicle body floor structure according to claim 1, wherein the floor cross beam comprises an upper member and a lower member, and the upper member and the lower member form a closed cross section,
the lower member comprises a lower wall forming a lower portion of the closed cross section and a rear wall forming a rear portion of the closed cross section, and
the rear wall of the lower member extends upward from the closed cross section and is joined to a front edge of the rear panel.

3. The vehicle body floor structure according to claim 2, wherein the upper member comprises a front wall forming a front portion of the closed cross section and an upper wall forming an upper portion of the closed cross section, and
the step portion is formed by the front wall and the upper wall, and the front wall has a ridge line that extends from a vehicle width outer end toward the floor tunnel at a height of the floor tunnel.

4. The vehicle body floor structure according to claim 2, wherein the step portion comprises a top portion at a center in the vehicle width direction where the floor cross beam and the floor tunnel are connected, and the top portion is highest in height from the front panel.

5. The vehicle body floor structure according to claim 4, wherein an upper edge of the rear wall comprises a curved portion, which is curved downward toward the lower longitudinal beam, between the top portion and an outer end of the floor cross beam in the vehicle width direction.

6. The vehicle body floor structure according to claim 2, wherein the rear wall comprises an inclined portion that is inclined forward toward the lower wall.

7. The vehicle body floor structure according to claim 2, wherein when viewed from a bottom of a vehicle body, the lower member comprises a recessed portion that is recessed upward toward the vehicle body at a center in the vehicle width direction,
the recessed portion is formed along an opening cross section of the floor tunnel and is connected to the opening cross section of the floor tunnel, and
the recessed portion comprises a widened portion expanding outward in the vehicle width direction on a rear side in a vehicle length direction.

8. The vehicle body floor structure according to claim 1, wherein the rear panel comprises a rear side frame on an outer side in the vehicle width direction,
the rear side frame and the floor cross beam are separated from each other in a vehicle length direction, and the lower longitudinal beam comprises a connecting member for connecting the rear side frame and the floor cross beam.

\* \* \* \* \*